United States Patent

Pelouch et al.

Patent Number: 5,377,043
Date of Patent: Dec. 27, 1994

[54] TI:SAPPHIRE-PUMPED HIGH REPETITION RATE FEMTOSECOND OPTICAL PARAMETRIC OSCILLATOR

[75] Inventors: Wayne S. Pelouch, Canandaigua; Peter E. Powers; Chung L. Tang, both of Ithaca, all of N.Y.

[73] Assignee: Cornell Research Foundation, Inc., Ithaca, N.Y.

[21] Appl. No.: 87,350

[22] Filed: Jul. 8, 1993

Related U.S. Application Data

[63] Continuation of Ser. No. 880,686, May 11, 1992, abandoned.

[51] Int. Cl.⁵ .............................................. H03F 7/00
[52] U.S. Cl. ..................................... 359/326; 359/330
[58] Field of Search ................... 359/326, 330; 372/20, 372/21, 22, 18

[56] References Cited

U.S. PATENT DOCUMENTS

| | | | |
|---|---|---|---|
| 3,548,199 | 12/1970 | Geusic et al. | |
| 3,949,323 | 4/1976 | Bierlein et al. | |
| 4,085,335 | 4/1978 | Guilino | |
| 4,231,838 | 11/1980 | Gier | |
| 4,305,778 | 12/1981 | Gier | |
| 4,464,761 | 8/1984 | Alfano et al. | 372/41 |
| 4,485,473 | 11/1984 | Tang et al. | |
| 4,517,675 | 5/1985 | Mourou et al. | |
| 4,612,641 | 9/1986 | Corkum | 372/54 |
| 4,639,923 | 1/1987 | Tang et al. | |
| 4,641,312 | 2/1987 | Schafer et al. | |
| 4,646,308 | 2/1987 | Kafka et al. | |
| 4,793,894 | 12/1988 | Jacco et al. | |
| 4,815,080 | 3/1989 | Chesnoy et al. | |
| 4,932,031 | 6/1990 | Alfano et al. | 372/18 |
| 4,951,294 | 8/1990 | Basu et al. | 372/21 |
| 5,017,806 | 5/1991 | Edelstein et al. | 359/330 |
| 5,033,057 | 7/1991 | Bosenberg et al. | |
| 5,034,951 | 7/1991 | Edelstein et al. | 372/18 |
| 5,047,668 | 9/1991 | Bosenberg | |
| 5,053,641 | 10/1991 | Cheng et al. | |
| 5,079,772 | 1/1992 | Negus et al. | 372/18 |
| 5,144,629 | 9/1992 | Basu | 372/20 |
| 5,163,059 | 11/1992 | Negus et al. | 372/18 |
| 5,212,698 | 5/1993 | Kafka et al. | 372/18 |

OTHER PUBLICATIONS

"Broadly Tunable High Repetition Rate Femtosecond Optical Parametric Oscillator" Edelstein et al, Appl. Phys. Lett 54 (18), 1 May 1989 pp. 1728–1730.

"Continuous-wave Mode-locked and Dispersion-Compensated Femtosecond Optical Parametric Oscillator" Wachman et al Optics Letters, vol. 15, No. 2, Jan. 15, 1990 pp. 136–138.

"CW Femtosecond Pulses Tunable in the Near- and Midinfraed" Wachman et al, J. Appl. Phys. 70 (3), 1 Aug. 1991.

"Broadly Tunable Femtosecond Pulses Generated by Optical Parametric Oscillator" Laenen et al, Optics Letters vol. 15, No. 17, Sep. 1, 1990, pp. 971–973.

(List continued on next page.)

Primary Examiner—John D. Lee
Assistant Examiner—Robert E. Wise
Attorney, Agent, or Firm—Jones, Tullar & Cooper

[57] ABSTRACT

A broadly tunable femtosecond optical parametric oscillator (OPO) based on KTiOPO₄ is externally pumped by a self-mode-locked Ti:sapphire laser. The laser is capable of continuous tuning from 1.2 micrometers to 1.37 micrometers in the signal branch and 1.8 to 2.15 micrometers in the idler branch, when using one set of OPO optics. Other optics expand the tuning range of the OPO from 1.0 micrometers to 2.75 micrometers, for example, by using three sets of mirrors and two different crystals. Without prisms in the OPO cavity, 215 mW of chirped pulses is generated in the signal branch, while 235 mW is generated in the idler branch. The total conversion efficiency, as measured by pump depletion, is 50%. With prisms in the cavity, nearly transform-limited pulses of 135 femtoseconds are generated, which can be shortened to 75 fs by increasing the output coupling.

18 Claims, 3 Drawing Sheets

OTHER PUBLICATIONS

"Externally Pumped High Repetition Rate Femtosecond Infrared Optical Parametric Oscillator" Mak et al, Appl. Phys. Lett. 60 (5), 3 Feb. 1992, pp. 542–544.

"60–fsec Pulse Generation from a Self–mode–locked Ti–Sapphire Laser" Spence et al, Optics Letters vol. 16, No. 1, Jan. 1, 1991, pp. 42–44.

"Quantum Theory of Self–Phase Modulcation" Wright, J. Opt. Soc. Am. B/vol. 7, No. 6, Jun. 1990 pp. 1142–1146..

"Theory of a Synchronously Pumped Optical Parametric Oscillator in Steady–state Operation", Cheung et al, J. Opt. Soc. Am. B. vol. 7, No. 8, Aug. 1990, pp. 1385–1401.

"Demonstration of Optical Parametric Oscillation in $\beta$–BaB$_2$O$_4$ in the Visible and Near Infrared" L. K. Cheng et al Conference on Lasers and Electro–Optics 25–29 Apr. 1988 pp. 531–528.

"Femtosecond ultraviolet pulse generation in $\beta$–BaB$_2$O$_4$" Edelstein et al *Appl. Phys. Lett* 52 (26) 27 Jun. 1988 pp. 2211–2213.

"Type II phase matching in a $\beta$–barium borate optical parametric oscillator" Bosenberg and Tang Appl. Phys. Lett 56 (19), 7 May 1990 pp. 1819–1821.

TI:SAPPHIRE-PUMPED HIGH REPETITION RATE FEMTOSECOND OPTICAL PARAMETRIC OSCILLATOR

This invention was made with Government support under Grant No. ECS-9108570 awarded by the National Science Foundation, and under Contract No. F4 9620-90-c-0039, awarded by the Air Force office of Scientific Research (AFOSR). The Government has certain rights in the invention.

This application is a continuation of application Ser. No. 07/880,656, filed May 11, 1992 (abandoned).

BACKGROUND OF THE INVENTION

The present invention relates, in general, to the production of ultra-short light pulses which are tunable in the infrared, and more particularly, to an externally pumped optical parametric oscillator which provides femtosecond output light pulses at a high repetition rate, the light being in the infrared wavelength band and being potentially tunable in a range from about 1.0 to about 2.75 micrometers.

Laser pulses in the femtosecond (fs) time domain; that is, pulses having widths of from $10^{-15}$ to $10^{-13}$ second, have become important tools for studying extremely short-duration events such as chemical reactions, for by directing femtosecond pulses at reacting chemicals, for example, researchers can capture spectroscopic information about the structure and behavior of short-lived molecular intermediates of the reactions. Femtosecond lasers are also important for studying the dynamics and the ultimate limits of high-speed semiconductor electronic and optical devices. Moreover, numerous ultrafast phenomena have been inaccessible to direct optical study due to a lack of light sources having appropriate wavelengths or having other suitable characteristics such as tunability or a high repetition rate.

A particularly interesting region of optical study lies in the near- to mid-infrared where, for example, it is possible to study carrier dynamics in most families of semiconductors as well as to do time-domain vibrational spectroscopy in many molecules. Tunable sub-picosecond pulses in various parts of the near- to mid-infra-region have been generated by a number of methods in the past, but such methods have either required amplification of a femtosecond laser followed by supercontinuum generation and seeded parametric amplification, or in one case has required a transient break up of picosecond pulses in a parametric oscillator. However, for many experiments, especially in condensed matter, the low pulse repetition rates of all of these methods, which generally have been in the range of about 10 Hertz, although some have been as high as 8 kHz, as well as the expense associated with the amplified systems, has created numerous problems.

Although optical parametric oscillators have been recently exploited in the femtosecond time domain as a source of broadly and continuously tunable radiation, a lack of suitable pump sources has hampered the development of such devices that operate with short pulses, high repetition rate, and high output power. The high peak powers at the intracavity focus of a colliding-pulse mode-locked dye laser were exploited to develop the first femtosecond optical parametric oscillator, described in U.S. Pat. No. 5,017,806. This resulted in pulses of about 105 fs, with a pulse repetition rate of about 80 MHz at approximately 3 mW output power. Others have resorted to a Q-switched and mode-locked laser (operating at 15 Hz) to pulse an OPO producing pulses having a duration of 160–260 fs (although obtaining 65 fs at one wavelength under special conditions) at 4.5 milliwatts average power (see R. Laenen et al, "Broadly Tunable Femtosecond Pulses Generated by Optical Parametric Oscillation", *Optics Letters*, Volume 15, No 17, Sep. 1, 1990, pages 971–973). More recently, a femtosecond OPO was reported which was externally pumped by a hybridly mode-locked dye laser, to produce 220 fs pulses at 30 mW average power. However, in order to meet present needs, a tunable source of optical pulses that operate with high output powers and high repetition rate, as well as with very narrow pulse widths is required.

SUMMARY OF THE INVENTION

The present invention is directed to a technique for producing high power, high repetition rate, femtosecond pulses over a broadly tunable range through the use of an externally pumped, self-mode-locked Ti:sapphire device. This laser, which can be operated with relative ease and produces hundreds of mW of broadly tunable femtosecond pulses in the sub-100 fs range in the infrared is believed to be the first femtosecond OPO which is externally pumped by a passively mode-locked high repetition rate solid state laser. Furthermore, the device of the present invention is believed to produce the shortest tunable pulses ever generated from an optical parametric oscillator.

The OPO is operated by a pump laser which is configured in a linear cavity utilizing spaced prisms for dispersion compensation. The pump utilizes a titanium-doped sapphire crystal mounted in a copper block and is self-mode-locked to produce 1.25 W of 125 fs pulses in the $TEM_{00}$ mode when pumped by a 15 watt argon ion laser. The output of the Ti: sapphire laser is focused onto one surface of a $KTiOPO_4$ (hereinafter referred to as KTP) crystal located in an optical parametric oscillator cavity. In the preferred form of the invention, the OPO cavity is linear, although a ring-type cavity may be used. In the linear form, a pair of flat mirrors are provided, one at each end, with one mirror providing an output coupler and the other mirror being on a movable mount, such as a piezoelectric transducer, for length adjustment of the cavity. Oscillation occurs when the cavity length of the OPO is matched to that of the pump laser cavity.

With 1.25 Watts of pump power at 125 fs, the optical parametric oscillator produces up to 215 mW in the signal branch through a one percent output coupler. A similar power may be obtained from the idler branch.

It has also been found that the OPO produces outputs at two other non-phase matched wavelengths which correspond to collinear second-harmonic generation of the signal branch and noncollinear sum-frequency generation between the pump and the signal. For example, for a pump wavelength of 780 nm and a signal wavelength of 1300 nm, the second harmonic wavelength is 650 nm and the sum-frequency wavelength is 485 nm. The OPO system of the present invention produces synchronized femtosecond radiation at five different wavelengths.

Tuning of the optical parametric oscillator of the present invention is straightforward and can be accomplished by three different mechanisms. Adjusting the length mismatch of the OPO cavity with respect to the pump cavity results in a wavelength shift, and a wavelength range of 50 nm has been measured for a variation of 5 micrometers in the length of the OPO cavity. A second way to tune the output of the OPO is to change the pump wavelength without changing the orientation of the KTP crystal or the alignment of the OPO. For example, the Ti: sapphire laser can be tuned from 765 nm to 815 nm while maintaining its mode-locking and cavity alignment. This results in tuning of the signal branch from 1.22 micrometers to 1.34 micrometers and results in tuning of the idler branch from 2.05 micrometers to 2.08 micrometers. A third way to tune the OPO is to use the traditional method of adjusting the phase-matching angle of the KTP crystal. Thus, by freely rotating this crystal and adjusting the cavity length, the output of the OPO can be tuned over a 100 nm range. The foregoing ranges have been obtained in an experimental optical parametric oscillator utilizing limited optics; the use of different optics makes the full tuning range of the system from about 1.0 micrometers to about 2.75 micrometers accessible.

BRIEF DESCRIPTION OF THE DRAWINGS

The foregoing and additional objects, features and advantages of the present invention will become apparent to those of skill in the art from the following detailed description of preferred embodiments thereof, taken in conjunction with the accompanying drawings, in which.

DESCRIPTION OF PREFERRED EMBODIMENTS

Figure 1:
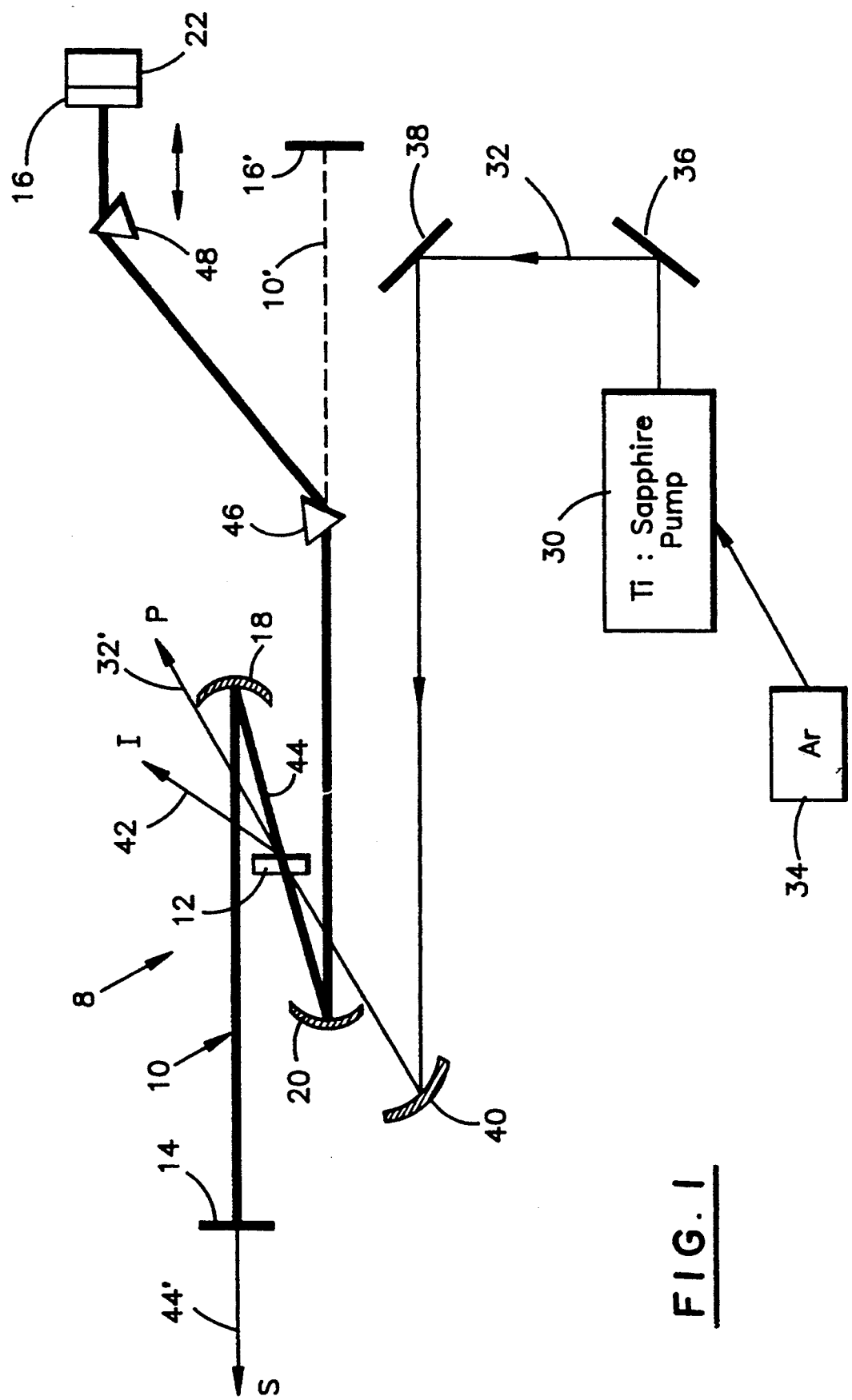
FIG. 1 is a schematic diagram of a preferred form of the optical parametric oscillator of the present invention.

Turning now to a more detailed consideration of the present invention, there is illustrated in FIG. 1 a continuous wave, femtosecond optical parametric oscillator 8 having a cavity 10 which incorporates a thin (for example 1.15 mm) KTP crystal 12. The OPO cavity in the illustrated embodiment is a linear cavity defined by flat end mirrors 14 and 16 and intermediate curved mirrors 18 and 20. The KTP crystal is located midway between the curved mirrors 18 and 20. The KTP crystal is cut at $\Theta=47.5°, \Psi=0°$ for type II phase matching ($0 \rightarrow e+0$) and is coated with a 2500 Angstrom layer of $MgF_2$ on both sides for high transmission centered at 1.3 micrometers. The OPO cavity 10 uses two R=10 cm curved mirrors 18 and 20 which are aligned for oscillation in the X-Z plane of the crystal to provide compensation for walkoff between the Poynting vectors of the pump and the resonated signal branch. Flat mirror 14 serves as the output coupler and the other flat mirror 16 is mounted for axial motion along the axis of the cavity by means of a movable mount 22 such as a piezoelectric transducer. The transducer 22 provides fine length adjustment for the OPO cavity.

The KTP crystal 12 is pumped by a Ti: sapphire pump laser 30 which is configured in a linear cavity with an 18 mm titanium doped (0.1%) sapphire crystal and a pair SF-14 prisms spaced at 40 cm, for example, for dispersion compensation. The sapphire crystal is mounted in a copper block and is cooled, using a thermoelectric cooler with temperature feedback to maintain a constant 25° C. temperature. The laser 30 is self-mode-locked as described, for example, by D. E. Spence et al, *Optical Letters* 16, page 42 (1991). The laser 30 produces an output beam 32 having a power of 1.25 W when pumped by a 15 W Argon ion laser such as that illustrated at 34. The output beam 32 is a stream of 125 fs pulses with a $TEM_{00}$ mode when the laser 30 is pumped by laser 34. The beam 32 is directed by way of flat mirrors 36 and 38 and curved mirror 40 to impinge on one surface of the KTP crystal 12 in the OPO cavity 10.

Impingement of the pumping beam 32 on the surface of KTP crystal 12 causes the crystal to emit three beams at its opposite surface; namely, a pump beam 32' which is a continuation of the input pump beam 32, an idler 42, and the desired signal beam 44. The signal beam 44 lies on the axis of the OPO cavity 10 (which is identified by the heavy line extending between mirrors 14 and 16) and is coupled through the one percent output coupler mirror 14 to provide the output signal 44'.

It has been found experimentally that with 1.25 W of pump power at 125 fs supplied by way of beam 32, the OPO 8 produces up to 215 mW in the signal branch through the one percent output coupler 14, at signal beam 44'. 45 mW of signal energy reflected from the KTP crystal in one direction (90 mW loss per round trip) has been measured, which implies a transmission loss of 0.2 percent. Thus, over 300 mW is generated in the signal branch with an effective output coupler of 1.4%. In the idler branch, 235 mW has been coupled out, although the amount of power available in this branch may be limited by the physical constraints of collecting and collimating the diverging idler radiation, which is generated at about 6° from the signal beam externally of the KTP crystal 12. The pump is depleted by 50% when the OPO is oscillating, and is a measure of the actual conversion efficiency, although only 35% of the energy is physically coupled out of the cavity 10 if the crystal reflections are not taken into account.

The OPO has also been found to produce output at two other non-phasematched wavelengths which correspond to collinear second-harmonic generation of the signal branch ($e+e \rightarrow e$) and noncollinear some-frequency generation between the pump and the signal ($0+e \rightarrow 0$). If the wavelength of the pump beam 32 is 780 nm, and the wavelength of the signal beam 44 is 1300 nm, then the second harmonic wavelength will be 650 nm, and the sum-frequency wavelength will be 485 nm. A total of about 14 mW of second-harmonic wavelength is generated (7 mW in each direction in the cavity 10), but only 1 mW gets transmitted through the infrared optics and output coupler 14. The collinear second harmonic wavelength could be utilized for experimental purposes, and is also useful for aligning the signal through extracavity optics, after which it can easily be filtered out. In the experimental operation of this device, 35 microwatts of sum-frequency light was also measured after the output coupler 14 so that overall, the OPO system 8 of the present invention produces synchronized femtosecond radiation at five different wavelengths.

Figure 2B:
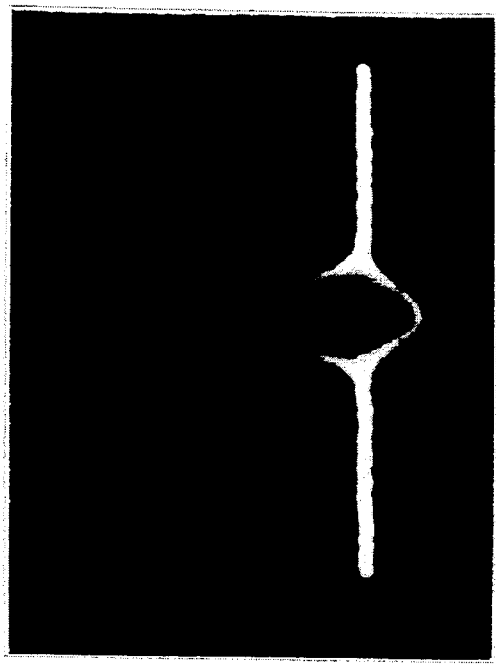
FIGS. 2a and 2b are spectrum and autocorrelation of an unchirped signal pulse for net negative group-velocity dispersion.
Figure 2D:
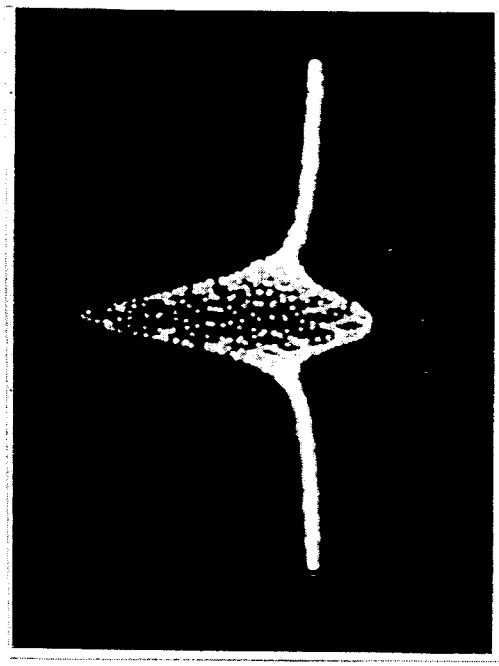
FIGS. 2c and 2d are spectrum and autocorrelation of chirped signal pulse for net positive group-velocity dispersion.
Figure 2A:
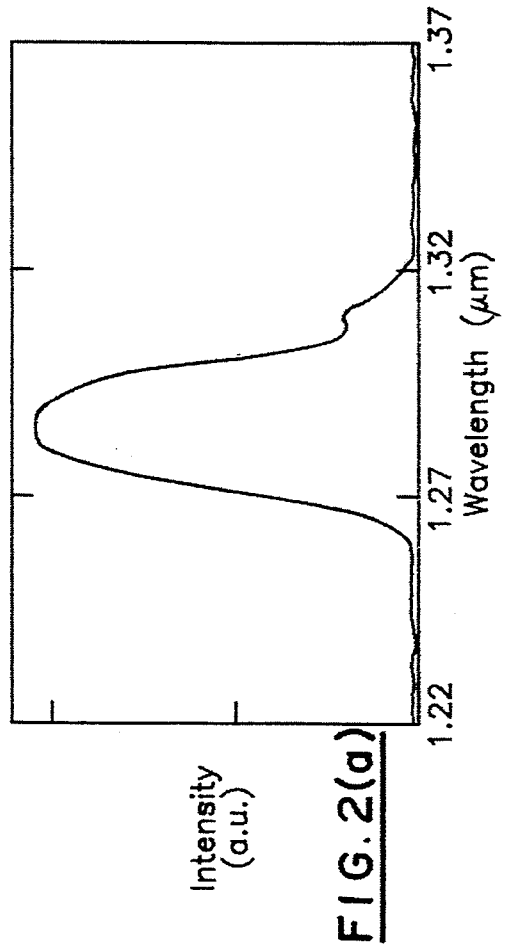
Figure 2C:
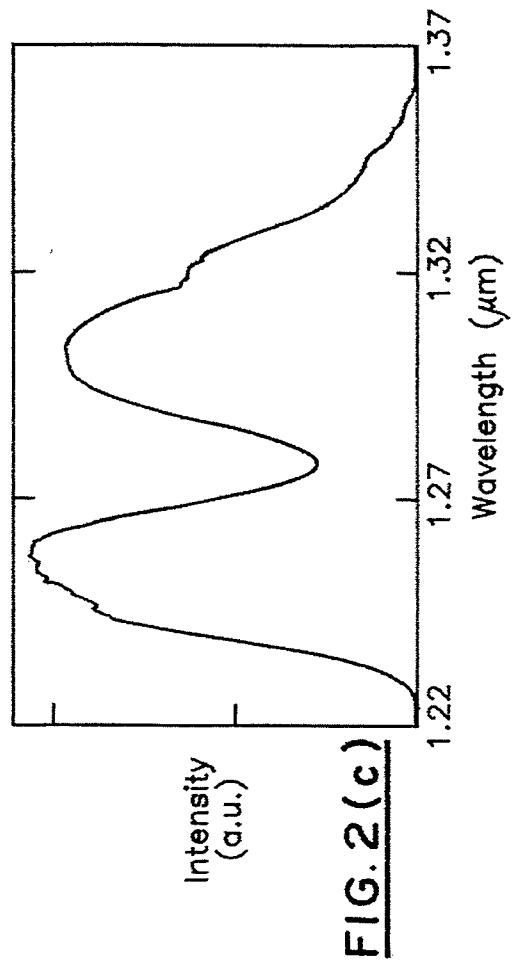

It is noted that a pair of prisms 46 and 48 are incorporated in the cavity 10 between mirrors 16 and 20. Without these prisms in the cavity the oscillation would follow path 10' to flat mirror 16, and in this case, the autocorrelation and the spectra of the beam 44 show signs of significant chirp. Furthermore, the pulse width, as measured from the intensity autocorrelation, is about 500 femtoseconds, which is much broader than the interferometric autocorrelation (100 fs) due to the long decay time of the wings. With the prisms 46 and 48 in the OPO cavity, two regimes are encountered. For net negative group-velocity dispersion (GVD), the pulses are unchirped, with a minimum pulse width of 135 fs, and have a smooth spectrum ($\Delta\nu\Delta\tau=0.45$). FIGS. 2a and 2b illustrate this FIG. 2a showing the intensity versus wavelength spectrum and FIG. 2b showing the autocorrelation of unchirped signal pulse for net negative group-velocity dispersion with a time-bandwidth product of 0.45. For net positive GVD, the pulses are chirped, with a minimum pulse width of 100 fs and with a split spectrum. FIG. 2c illustrates the split spectrum while 2d illustrates the autocorrelation of chirped signal pulses for net positive group-velocity dispersion. Near zero group velocity dispersion, the OPO may abruptly flip into either the chirped or the unchirped modes. This behavior is in contrast to the observed smooth transition between operation with negative and positive group velocity dispersion which has been reported previously. Therefore, it is theorized that a non-linear chirp must be generated in the KTP crystal, which accounts for the runaway condition in the positive group velocity dispersion regime. This effect is most likely due to self-phase modulation of the signal in the crystal 12 due to the high intra-cavity intensity and large non-linear index of KTP. It is expected that the pulse widths are approximately constant over the tuning range in the present invention due to the relatively constant inverse group-velocity mismatch between the pump and the signal. The larger mismatch for the idler suggests pulse width approximately 50% greater than the signal.

It has also been observed in the unchirped regime that a slight de-tuning of the length of the cavity resulted in a shortening of the pulse widths to about 75 fs, accompanied by a reduction in the power output by about 25%. The same effect was observed when a thin glass flat was inserted in the cavity 10 and rotated away from Brewster's angle, thereby effectively reducing the intracavity power by increasing the output coupling to 1.3% (plus 0.4% from the crystal). Pulse shortening thus results from a decrease in intracavity power as the OPO is operated closer to threshold.

Tuning of the optical parametric oscillator 8 of FIG. 1 is straightforward, and may be accomplished in three different ways. First of all, adjusting the length mismatch of the OPO cavity 10 with respect to the length of the cavity of pump laser 30 results in a wavelength shift, and may be used to stabilize the OPO at a fixed wavelength. The wavelength range over which the OPO will continue to oscillate while adjusting its length is a measure of how sensitive the OPO is to length variations. Experimentally, this wavelength range has been measured to be 50 nm for a 5 micrometer length variation of the cavity 10.

A second method of tuning the OPO is accomplished by changing the pump wavelength. This will tune the OPO without changing the crystal orientation or OPO alignment. However, the length of the OPO cavity must be adjusted to match the new pump cavity length. For example, the Ti: sapphire laser 30 can be tuned from 765 nm to 815 nm, while maintaining mode-locking and cavity alignment within the pump 30. This results in tuning of the signal branch 44' from 122 micrometers to 134 micrometers and further results in tuning of the idler branch from 2.05 micrometers to 2.08 micrometers. It will be noted that the wavelength of the idler remains relatively fixed, whereas the signal is tuned over a range of 120 nm as the pump wavelength is varied over 50 nm. Typically, this type of tuning will also result in a change in pump power.

A third way to tune the OPO is the traditional method of adjusting the phase-matching angle of the KTP crystal 12. Thus, it is possible to tune over a 100 nm range by freely rotating the KTP crystal and adjusting the length of cavity 10. Beyond this range the OPO alignment needs to be modified. The operation of the OPO is quite robust so that broad tuning is accomplished by iterating between rotating the crystal and adjusting the OPO alignment while maintaining oscillation.

Figure 3:
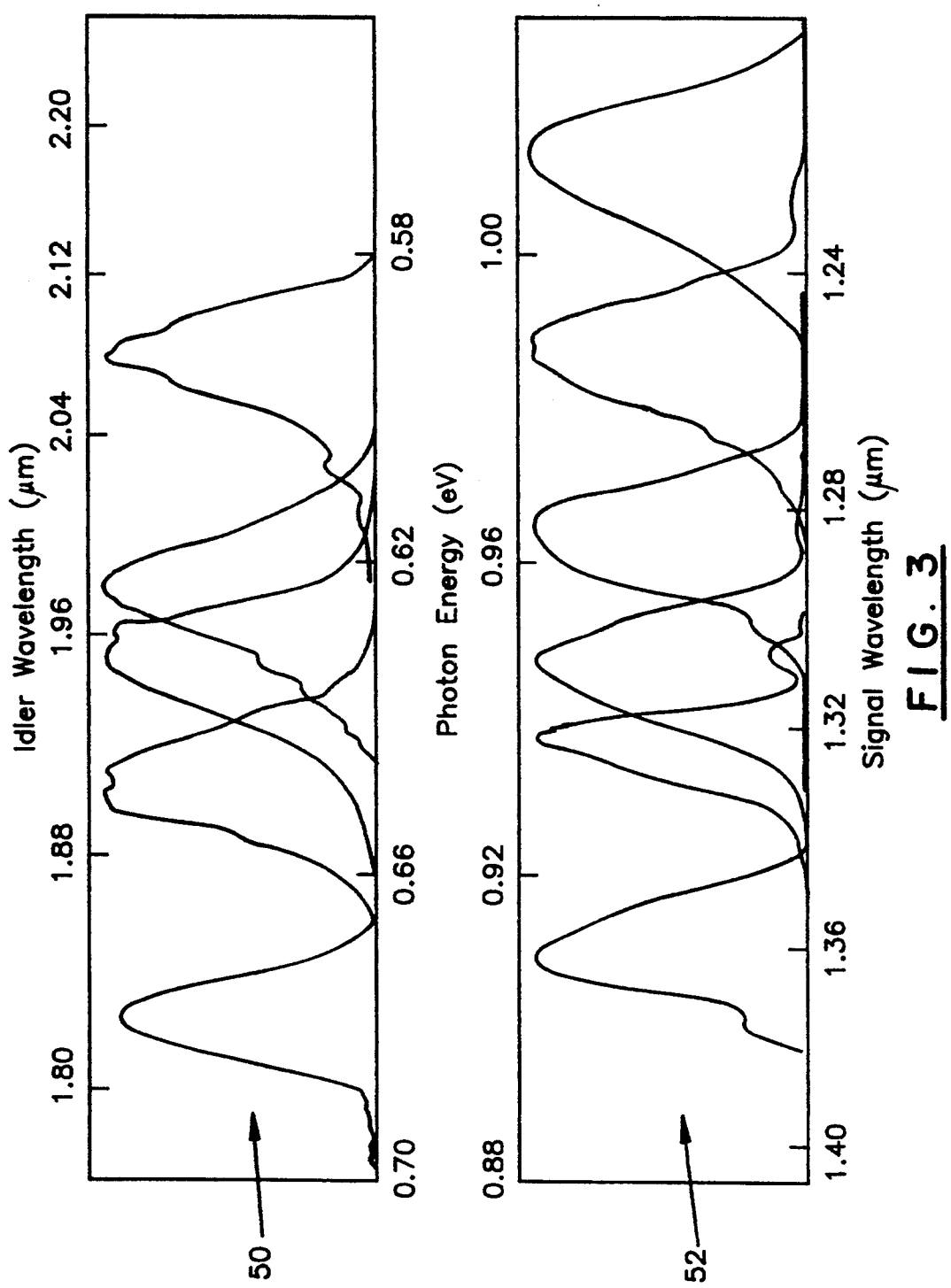
FIG. 3 illustrates OPO signal and idler spectra obtained by angle-tuning the OPO using a single set of mirrors.

Representative spectra are displayed in FIG. 3 for both the signal and the idler. In FIG. 3 the upper curve 50 illustrates the idler wavelength spectrum obtained by angle tuning the OPO over a range of one set of mirrors. In similar manner, the lower curve 52 represents signal spectra obtained in the same manner. Broad tuning of both signals may also be achieved by changing the pump wavelength without rotating the KTP crystal or altering the OPO alignment. The tuning range described above and illustrated in the Figures was that obtainable by the optics available for the tests conducted to obtain these measurements, but it will be understood that with appropriate optics the full tuning range will be accessible.

The OPO is aligned by monitoring the spontaneous parametric scattering (SPS) using a liquid nitrogen cooled germanium photodiode (peak detectivity is $\sim 10^{13}$ cm Hz$^{\frac{1}{2}}$/W at 1.5 $\mu$m). This signal is maximized by adjusting the OPO mirrors and focusing such that the SPS makes many round trips in the cavity. Oscillation occurs when the cavity length of the OPO is matched to that of the pump laser cavity; the length mismatch becomes more sensitive near threshold.

No alignment of the OPO 8 is necessary on a day to day basis; length adjustment is all that is required to regain oscillation. Furthermore, the OPO of the present invention is not extremely sensitive to pump steering; alignment of the pump through a pair of spaced pin holes will suffice to recover oscillation if the Ti: sapphire laser pump should become misaligned. The output of the OPO is an excellent TEM$_{00}$ mode which is made possible by the tight Z focus which is illustrated in FIG. 1. Thus, the OPO of the present invention is a practical laser source for experimental ultra-fast research.

A linear cavity design was selected for the OPO that was constructed for purposes of experimentation and which is illustrated in FIG. 1. This was done so that the pump could be retroreflected for double-pass pumping of the KTP crystal, if desired. This would result in parametric gain for the signal in both directions through the crystal when the retroreflected pump pulses overlap the signal pulses in the crystal. However, this would require an optical isolator between the pump laser and the OPO to reject feedback into the Ti: sapphire cavity. Double pass pumping has not been required, since excellent conversion efficiency has already been achieved. In another embodiment, if only one pass of the pump is used, then a ring cavity can be used in place of the linear cavity 10, for such a ring cavity would provide less loss than the linear cavity.

In summary, the present invention provides a high power, high repetition rate femtosecond optical parametric oscillator which is externally pumped by a continuous wave, self-mode-locked Ti: sapphire laser. More than 0.5 W of the pump laser is converted to tunable OPO radiation for a conversion efficiency of 50%. Nearly transform-limited pulses of 135 fs are generated across the tuning range of the device, and pulse shortening to 75 fs is achieved by increasing the output coupling, although at the expense of output power. Although the present invention has been described in terms of preferred embodiments, it will be understood that variations and modifications can be made without departing from the true spirit and scope thereof, as set forth in the following claims.

What is claimed is:

1. A broadly tunable femtosecond optical parametric oscillator, comprising:
   (a) an oscillator cavity including beam output means;
   (b) a thin, non-linear optical crystal located in said cavity;
   (c) a continuous wave, mode-locked, titanium-doped sapphire crystal laser pumping source located externally of said cavity and producing a femtosecond pulsed pumping light beam having a first wavelength and a high repetition rate; and
   (d) means directing said pumping light beam onto a surface of said crystal to generate corresponding high repetition rate pulsed idler and signal beams at respective second and third wavelengths from said crystal, a selected one of said idler and signal beams being directed along said cavity for oscillation therein, a portion of said selected beam being emitted from said cavity through said beam output means.

2. The optical parametric oscillator of claim 1, wherein said laser pumping source pulses have a pulse width of between about 50 and 200 femtoseconds.

3. The optical parametic oscillator of claim 1, wherein laser pumping source produces corresponding femtosecond pulsed idler and signal beams whereby said emitted beam consists of femtosecond pulses.

4. The optical parametic oscillator of claim 3, further including tuning means for adjusting the wavelength of said output beam.

5. The optical parametric oscillator of claim 4, wherein said cavity has an adjustable length, and wherein said tuning means includes means for adjusting the length of said cavity.

6. The optical parametric oscillator of claim 4, wherein said tuning means includes means for varying said first wavelength of said pumping light beam.

7. The optical parametric oscillator of claim 4, wherein said crystal is rotatable to adjust its phase-matching angle, and wherein said tuning means includes means for rotating said crystal.

8. The optical parametric oscillator of claim 7, wherein said tuning means further includes means for varying said first wavelength of said pumping light beam.

9. The optical parametric oscillator of claim 4, wherein said tuning means includes means for tuning said laser pumping source over a predetermined wavelength range.

10. The optical parametric oscillator of claim 1, further including tuning means for varying the wavelength of said emitted beam.

11. The optical parametric oscillator of claim 10, wherein said tuning means comprises means adjusting the phase-matching of said crystal.

12. The optical parametric oscillator of claim 11, wherein said means adjusting the phase-matching of said crystal includes means for rotating said crystal and means for adjusting the length of said cavity.

13. The optical parametric oscillator of claim 10, wherein said tuning means includes means for adjusting the length of said cavity.

14. The optical parametric oscillator of claim 10, wherein said tuning means includes means for changing the wavelength of said pumping light beam.

15. The optical parametric oscillator of claim 14, wherein said pumping light beam is variable over a predetermined wavelength range to vary the wavelength of said emitted beam over a corresponding range.

16. The optical parametric oscillator of claim 1, wherein said optical crystal is KTP.

17. The optical parametric oscillator of claim 16, wherein said optical crystal is cut for type II phase matching.

18. The optical parametric oscillator of claim 1, wherein said laser pumping source operates at a repetition rate of about 100 MHz.

* * * * *

UNITED STATES PATENT AND TRADEMARK OFFICE
CERTIFICATE OF CORRECTION

PATENT NO. : 5,377,043

DATED : December 27, 1994

INVENTOR(S) : Pelouch et al.

It is certified that error appears in the above-identified patent and that said Letters Patent is hereby corrected as shown below:

Title page, item [63]:
Related US Application:
"880,686" should be --880,656--

Column 7:
Claim 2, line 3
after "and" --about-- should be inserted

Signed and Sealed this

Twenty-eight Day of March, 1995

Attest:

BRUCE LEHMAN

Attesting Officer       Commissioner of Patents and Trademarks